United States Patent [19]

Ogawa

[11] Patent Number: 5,436,517
[45] Date of Patent: Jul. 25, 1995

[54] RECORDING DISK DRIVING APPARATUS

[75] Inventor: Tokumon Ogawa, Komagane, Japan

[73] Assignee: Nagano Nidec Corporation, Nagano, Japan

[21] Appl. No.: 110,853

[22] Filed: Aug. 24, 1993

[30] Foreign Application Priority Data

| Aug. 24, 1992 | [JP] | Japan | 4-248779 |
| Oct. 1, 1992 | [JP] | Japan | 4-289470 |
| Jan. 7, 1993 | [JP] | Japan | 5-018038 |
| Feb. 16, 1993 | [JP] | Japan | 5-051336 |

[51] Int. Cl.$^6$ .............. H02K 5/00; H02K 5/04; H02K 1/18; H02K 7/14
[52] U.S. Cl. .................. 310/91; 310/67 R; 310/217
[58] Field of Search .......... 310/40 MM, 67 R, 91, 310/217, 218, 259; 360/98.07, 99.04, 99.08

[56] References Cited

U.S. PATENT DOCUMENTS

| 4,129,796 | 12/1978 | Papst | 310/67 R |
| 4,682,065 | 7/1987 | English et al. | 310/67 R |
| 4,703,212 | 10/1987 | Aboukrat et al. | 310/67 R |
| 4,934,041 | 6/1990 | Hoover et al. | 310/91 |
| 4,965,476 | 10/1990 | Lin | 310/51 |
| 5,025,336 | 6/1991 | Morehouse et al. | 360/97.02 |
| 5,173,628 | 12/1992 | Yoshida et al. | 310/67 R |
| 5,241,229 | 8/1993 | Katakura et al. | 310/51 |
| 5,264,748 | 11/1993 | Ootsuka et al. | 310/67 R |
| 5,291,358 | 3/1994 | Takahashi | 360/99.08 |

FOREIGN PATENT DOCUMENTS

| 2-250647 | 10/1990 | Japan | 310/91 |
| 5-111226 | 4/1993 | Japan | 310/68 B |
| 2234639 | 2/1991 | United Kingdom | 310/91 |

Primary Examiner—Clayton E. LaBalle
Attorney, Agent, or Firm—McCormick, Paulding & Huber

[57] ABSTRACT

A recording disk driving apparatus comprising a base plate, a cover member defining a disk chamber in cooperation with the base plate, a spindle motor disposed in the disk chamber, and a recording disk to be rotated and driven by the spindle motor. The base plate has a first convex portion projecting greatly inwardly and a second convex portion projecting greatly inwardly, and in correspondence to the first convex portion, a receiving concave portion for accommodating electronic components is provided in its back surface. Furthermore, a raising preventing member is provided to prevent the raising of the drawing portion of the flexible circuit board for supplying an electric current to the spindle motor.

9 Claims, 11 Drawing Sheets

RECORDING DISK DRIVING APPARATUS

FIELD OF THE INVENTION

This invention relates to a disk driving apparatus for rotating and driving a recording disk such as a magnetic disk.

DESCRIPTION OF THE PRIOR ART

Generally, a disk driving apparatus for rotating and driving a recording disk such as a hard disk, as disclosed in U. S. Pat. No. 5,025,336 for example, is provided with a base plate, a cover member for defining a disk chamber in cooperation with the base plate, a spindle motor disposed in the disk chamber, a recording disk rotated and driven by the spindle motor, and a head means from which information is written into the recording disk and/or the information is read from the recording disk. Furthermore, the spindle motor has a rotor rotatable relatively to the base plate, a magnet mounted on the rotor and a stator disposed in opposition to the rotor magnet, and the recording disk is fitted to the rotor as required.

In this type of recording disk driving apparatus, with a tendency to make personal computers small-sized and thin in thickness, a requirement for more small-sized and thinner articles is strongly desired in recent years. To meet this requirement, there has been proposed a form in which the bracket of the spindle motor and the base plate of the disk driving apparatus are constructed into an integrated unit.

However, by only integrating the bracket of the motor and the base plate, the apparatus cannot be fully made small-sized and thin, and a further improvement is desired.

Furthermore, in this type of recording disk driving apparatus, a flexible circuit board for a spindle motor is disposed in the inside surface of the base plate. A band-like drawing portion is provided in this flexible circuit board, and extends radially outwardly. It is then electrically connected to a connector provided at one end portion of the base plate. On the other hand, for example, a personal computer to which the disk driving apparatus is secured has a main body side connector provided therein. When the disk driving apparatus is secured to the computer, the connector of the disk driving apparatus is connected to the main body side connector. Accordingly, a current from the computer is supplied to the spindle motor through the flexible circuit board whereby the spindle motor is rotated and driven in a predetermined direction.

However, with the smaller sizing and thinner sizing of the recording disk driving apparatus, the distance between the rotor and the base plate, therefore the distance between the rotor and the flexible circuit board, becomes smaller. When the drawing portion of the flexible circuit board is somewhat raised from the base plate, this flexible circuit board gets into contact with the rotor, and it becomes a cause of occurrence of unusual sounds at the time of rotation.

Furthermore, a motor used in the recording disk driving apparatus, etc. is inclined to become small-sized and thin-sized. To satisfy this inclination, various parts of the motor may be made thin. But if they are made thin, their rigidity becomes weak, and they are liable to develop vibrations. Especially, when the base member supporting the stator is made thin in thickness, vibrations are liable to develop.

SUMMARY OF THE INVENTION

It is a first object of this invention to provide a recording disk driving apparatus which can effectively achieve the smaller sizing and thinner sizing of the entire apparatus.

It is a second object of this invention to provide a recording disk driving apparatus in which the raising of the flexible circuit board can be prevented surely.

It is a third object of this invention to provide a recording disk driving apparatus in which the stator can be positioned at a predetermined position and can be surely fixed to the base member.

The other objects and features of this invention will be easily understood from the following description.

DETAILED DESCRIPTION OF THE PREFERRED EMBODIMENTS

Specific examples of the recording disk driving apparatus in accordance with this invention will be illustrated with reference to the accompanying drawings.

Figure 1:
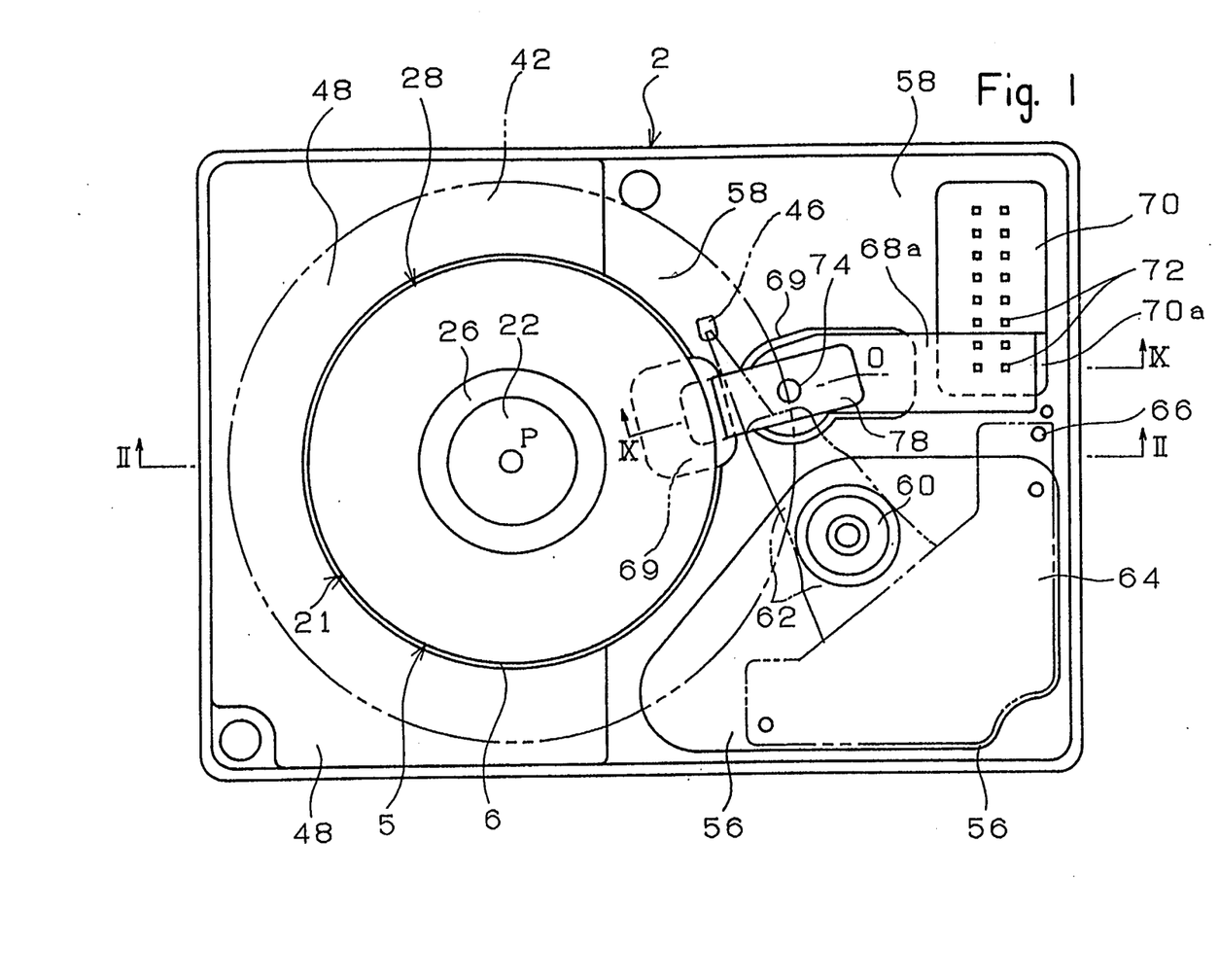
FIG. 1 is a top plan view showing one specific example of the recording disk driving apparatus in accordance with this invention in a condition in which the cover member is removed.
Figure 2:
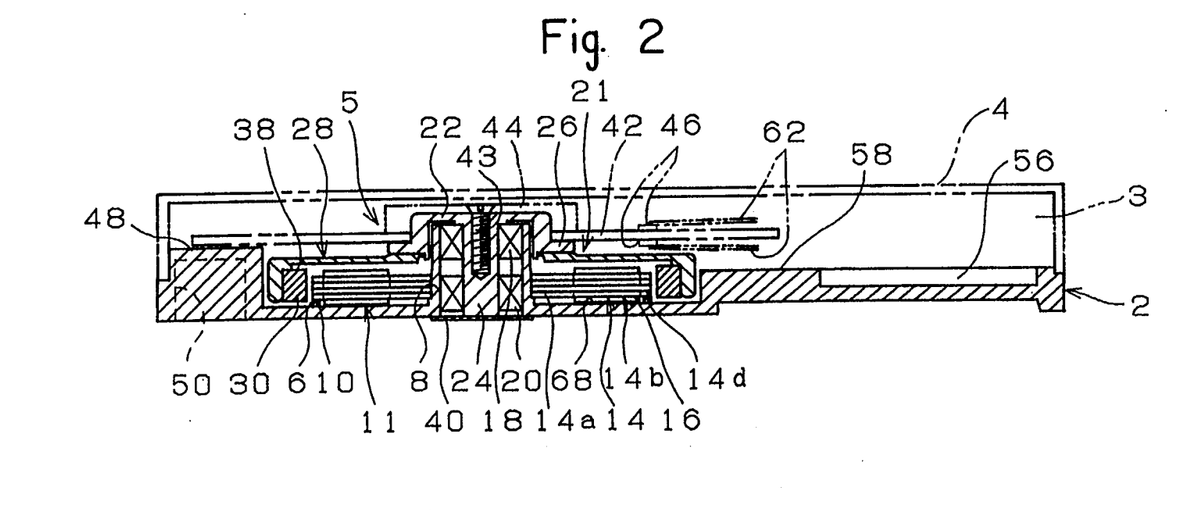
FIG. 2 is a sectional view showing a II-0-II line in FIG. 1.

In FIGS. 1 and 2, the illustrated recording disk driving apparatus is provided with a base plate 2 and a cover member 4 defining a disk chamber 3 in cooperation with the base plate 2, and a spindle motor shown by a reference numeral 5 is mounted on the base plate 2.

The base plate 2 is nearly rectangular, and its left central portion is provided with an annular concave portion 6 (constituting a first concave portion). This annular concave portion 6 is opened toward the side of the disk chamber 3. A cylindrical portion 8 projecting substantially perpendicularly upwardly from the base plate 2 is provided integrally in the inner peripheral edge portion of the annular concave portion 6, and the outer peripheral surface of this cylindrical portion 8 defines the inner peripheral surface of the annular concave portion 6. A through-hole is formed in the inside portion of the cylindrical portion 8.

Figure 3:
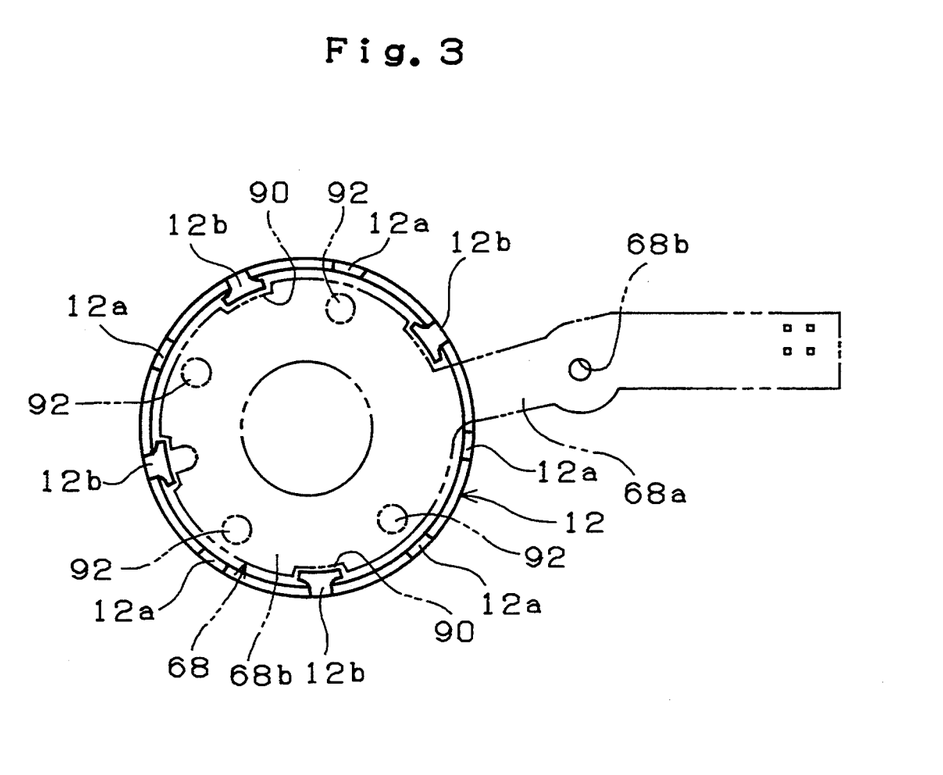
FIG. 3 is a top plan view showing an annular member in the disk driving apparatus in FIG. 1.

A stator 11 is mounted on the outer peripheral surface of the cylindrical portion 8, and in relation to this stator 11, the following construction is created. Mainly with reference to FIGS. 3 and 4, an annular member 12 for holding the stator 11 is constructed of an annular supporting portion 10 and positioning protrusions 12a and 12b projecting axially upwardly from the supporting portion 10. In the specific example, the positioning protrusions 12a and 12b are provided in a number of 9 at intervals of substantially 40°. The positioning protrusion 12a of one form has only an upper protruding portion projecting axially upwardly, and the positioning protrusion 12b of the other form has an upper protruding portion projecting axially upwardly and an inner protruding portion projecting radially inwardly from the free end of the upper protruding portion. This inner protruding portion somewhat diverges peripherally. Tow types of positioning protrusions 12a and 12b as shown in FIG. 3, are alternately arranged except that the positioning protrusions 12a positioned on the right side are arranged continuously. This annular member 12 may be formed from heat-resistant synthetic resins such as PPS having a heat-resistant temperature of 220°.

Figure 4:
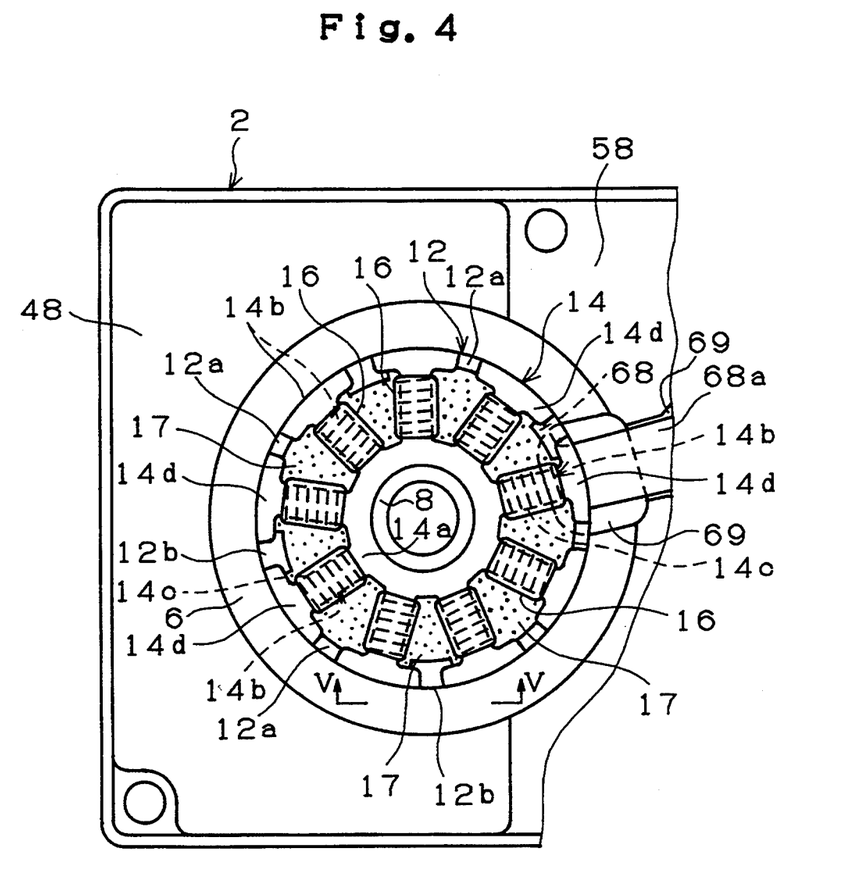
FIG. 4 is a partial top plan view showing the stator and the annular member and their neighborhood of these in the disk driving device in FIG. 1.

The stator 11 has a stator core 14 formed by laminating a plurality of core plates. The stator core 14 has an annular base portion 14a and a tooth portion 14b extending radially outwardly from the annular base portion 14a. In the specific example, nine tooth portions 14b are provided substantially at equal intervals in the peripheral direction, and each tooth portion 14b has a coupling portion 14c extending radially from the annular base portion 14a and an addendum portion 14d provided at the forward end portion of the coupling portion 14c. The addendum portion 14d is projected toward both sides in the peripheral direction from the coupling portion 14c. Coils 16 are wound up on the stator core 14 as required. Namely, the coils 16 are wound up on the coupling portions 14c of a plurality of tooth portions 14b.

Figure 5:
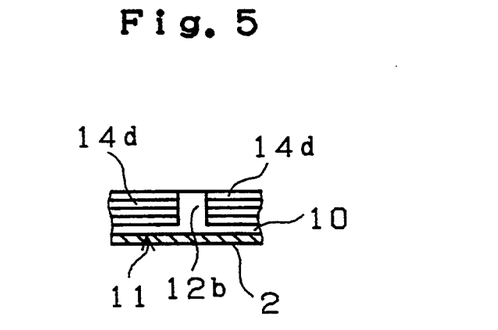
FIG. 5 is a sectional view of a V—V line in FIG. 4.

The mounting between the annular member 12 and the stator 11 is carried out in the following manner. The stator 11 is mounted on the annular member 12 from above the annular member 12. When the stator 11 is mounted on the annular member 12, it is shown in FIGS. 4 and 5 that the positioning protrusions 12a and 12b are positioned between the addendum portions 14d of the corresponding tooth portions 14b of the stator core 14, and in cooperation with the addendum portions 14d, define an annular accommodating space. The under surface of each addendum portion 14d is placed on the supporting portion 10 of the annular member 12 (FIG. 5). Accordingly, when the annular member 12 is coupled with the stator 11, it will be easily understood that the bottom surface of the outer peripheral portion of the coupled product is defined by the bottom surface of the supporting portion 10 of the annular member 12. Furthermore, the outer peripheral surface of this coupled product is defined by the supporting portion 10 of the annular member 12, the outer peripheral surfaces of the positioning protrusions 12a and 12b, and the forward end portion of the addendum portion 14d of the stator core 14, and furthermore, the upper surface of the outer peripheral portion of the coupled product is defined by the upper end portions of the positioning protrusions 12a and 12b of the annular member 12 and the upper surface of the addendum portion 14d of the stator core 14. In addition, the inner projecting portions of four positioning protrusions 12b act on the inner surface of the addendum portion 14d of the adjoining tooth portion 14b to hold it. Accordingly, the action of the positioning protrusions 12a and 12b impedes relative rotation of the annular member 12 and the stator 11. Furthermore, the action of an inner space portion of the positioning protrusion 12b impedes the relative movement in a perpendicular direction with respect to an axial direction. The above-mentioned coupled state of the annular member 12 and the stator 11 is held.

In order to supply a current to the spindle motor 5, a flexible circuit board 68 is interposed between the base plate 2 and the stator 11. The illustrated flexible circuit board 68 has an annular main body portion 68b and a drawing portion 68a extending radially outwardly (in the right direction in FIG. 1) from this annular main body portion 68b. The outside diameter of the annular main body portion 68b is slightly smaller than the inside diameter of the supporting portion 10 of the annular member 12, and a notched portion 90 is formed in correspondence to the inner projecting portion of the positioning protrusion 12b in the outer peripheral portion of the annular main body portion 68b.

The flexible circuit board 68 is adhered to the under surface of the stator coil 16. The drawing portion (not shown) of the stator coil 16 is connected by soldering to a terminal region 92 provided in the upper surface of the flexible circuit board 68 at the time of adhering. At the same time, the notched portion 90 is positioned in correspondence to the inner projecting portion of the positioning protrusion 12d of the annular member 12.

In the stator 11 to which the annular member 12 and the flexible circuit board 68 are secured in this way, its annular base portion 14a is outwardly inserted and fixed into and to the outer peripheral portion of the cylindrical portion 8 of the base plate 2. The under surface of the annular member 12 comes in contact with the upper surface of the base plate 2 while partly interposing the drawing portion 68a. An accommodating concave portion 69 is provided at a predetermined portion of the base plate 2, and this accommodating concave portion 69 extends radially outwardly from the bottom surface of the annular concave portion 6. The drawing portion 68a of the flexible circuit board 68 is conducted outwardly through the accommodating concave portion 69, and its raising is prevented by the annular member 12 covering the accommodating concave portion 69. Furthermore, when the drawing portion 68a is positioned in the accommodating concave portion 69, the flexible circuit board 68 is held at a predetermined angular position.

After the stator 11 is mounted as shown above, an adhesive 17 is filled into an accommodating space defined by the annular member 12 and the stator 11. This adhesive 17 has a dual function of filling and adhesion, and from the viewpoint of heat resistance, it is preferably thermosetting. For example, it is preferred that it is hardened when heated at about 100° C. By so filling the adhesive 17, the base plate 2, the annular member 12, the stator 11 and the flexible circuit board 68 are exactly blocked integrally.

The distance between the supporting portion 10 of the annular member 12 and the addendum portion 14d of the stator core 14 and the distance between the positioning protrusions 12a and 12b of the annular member 12 and the adjoining addendum portions 14d of the stator core 14 should desirably be such that the adhesive 17 intrudes into a clearance of them to adhere and does not flow out (about 0.1 mm although depending upon the properties of the adhesive, such as its viscosity). It may be small such that the adhesive does not almost leak out from the clearance.

In the specific example, the positioning protrusions 12a and 12b of the annular member 12 are positioned between the adjoining tooth portions 14b of the stator core 14, and the annular base portion 14a of the stator core 12 is mounted on the cylindrical portion 8 of the base plate 2. Since the stator core 14, the annular member 12, the stator coils 16 and the flexible circuit board 68 are integrally fixed to the base plate 2 by means of the adhesive 17, the rigidity of the stator core 14 is increased together with the rigidity of the annular member 12 and the base plate 2. Since the adhesive 17 is filled over the entire periphery of the stator core 14, its effect is very great. This increases the characteristic frequency of the stator core 14 to prevent the generation of resonance. Accordingly, the vibrations are effectively inhibited, and this greatly contributes to an increase in rotation precision. Thus, it will be effective in increasing the recording density of the recording disk.

Since as in this specific example, the annular member 12 is formed from a non-metallic material, unlike the case of forming the positioning protrusions 12a and 12b and the supporting portion 10 from a metal, the occurrence of eddy current loss and hysteresis loss at the time of driving the motor is prevented, and good current characteristics will be realized.

Figure 6:
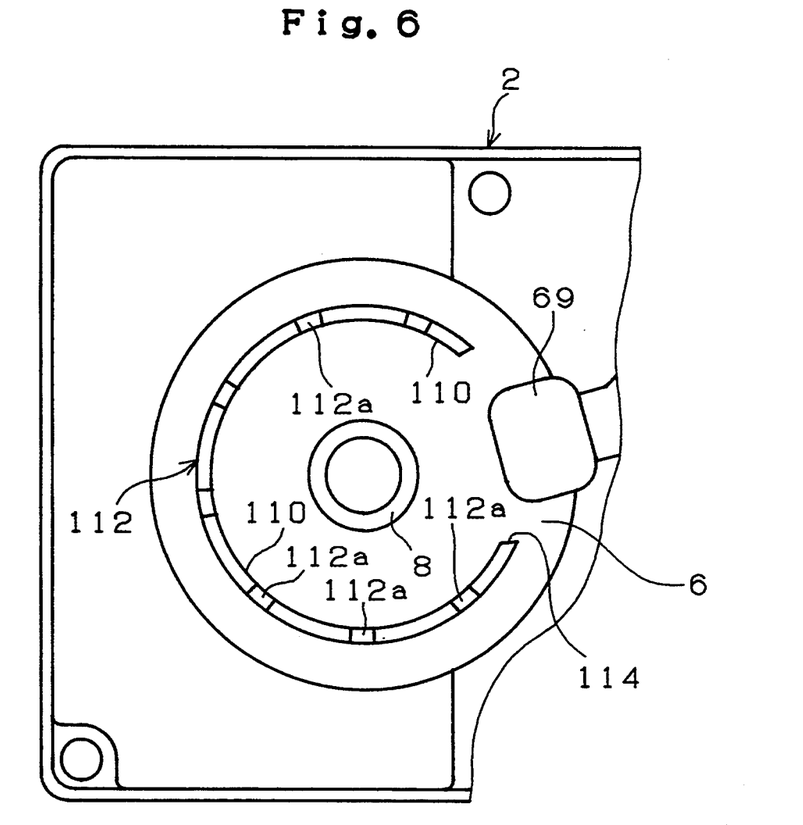
FIG. 6 is a partial top plan view showing a modified example of the annular member.

The annular member may be provided integrally with the base plate 2. with reference to FIG. 6, an illustrated annular member 112 has a nearly ring-like supporting portion 110 and a positioning protrusions 112a disposed at a clearance (substantially a clearance of 40°) from the supporting portion 110. In this modified example, the annular member 112 is formed from aluminum integrally with the base plate 2, and furthermore, the positioning protrusion 112a is constructed of a single body extending axially. As in the modified example, when the annular member 112 is provided integrally on the base plate 2, the stator core 14 may be positioned in the annular member 112 as is required. Accordingly, the positioning protrusion 12b (a positioning protrusion having an inner protrusion) in the specific example in FIGS. 1 to 5 is not always required.

In the modified example, a part of the annular member 112 is notched and therefore, 7 positioning protrusions 112a are only provided in the supporting portion 110. This notch 114 is provided to conduct out the drawing portion 68a of the flexible circuit board 68 outwardly, and the drawing portion 68a extends radially outwardly through the notch 114. The stator 11 and the flexible circuit board 68 are flocked to the base plate 2 and the annular member 112 by means of an adhesive 17.

Again with reference mainly to FIG. 2, the rotor 21 is rotatably supported via a pair of bearings 18 and 20. The outer wheels of the bearings 18 and 20 are fixed to the inner peripheral surface of the cylindrical portion 8 of the base plate 2 by means of an adhesive agent. The rotor 21 has a hub portion 22 and a rotor portion 28 provided in the under side of the hub portion 22. A rotating shaft 24 is provided centrally in the hub portion 22. The inside wheels of the bearings 18 and 20 are fixed to the outer peripheral surface of the rotating shaft 24 by means of an adhesive agent whereby the hub portion 22 is supported rotatably by the base plate 2 concentrically with respect to the annular concave portion 6. A bulging portion 26 for supporting a recording disk 42 such as a hard disk is provided at the low end portion of the outer peripheral wall of the outer wall of the hub portion 22. A rotor portion 28 holding a rotor magnet 30 is fixed to the under side of the bulging portion 26. This rotor portion 28 and hub portion 22 constitute a rotor. A suspending portion 28a holding an annular rotor magnet 30 in the inside peripheral surface is provided in the outer peripheral portion of the rotor portion 28. The suspending portion 28a and the annular concave portion 6 are opposed to each other with a slight diametrical space therebetween. The rotor magnet 30 and the stator core 14 are opposed to each other with a diametrical gap therebetween. The rotor portion 28 is constructed of a soft magnetic material, and has a dual function of the yoke of the rotor magnet 30 and a magnetic shield plate.

The suspending portion 28a of the rotor portion 28, the magnet 30, the stator core 14 and the stator coil 16 are nearly accommodated in the annular concave portion 6 of the base plate 2. The cylindrical portion 8, the hub portion 22, the rotor portion 28, the stator core 14, the magnet 30, the suspending portion 28a, etc. and the annular concave portion 6 give a labyrinth effect. The fine particles of a lubricant for the bearings 18 and 20 are prevented from scattering in a disk chamber 3. Furthermore, an annular groove portion 38 opening vertically inwardly which is formed between the rotor portion 28 and the magnet 30 reserves the fine particles of the lubricant from the bearings 18 and 20 and prevents them from scattering in the disk chamber 3. Furthermore, a sealing member 40 for sealing the opening is disposed in the opening portion of the cylindrical portion 8.

In the specific example, a spindle motor 3 for rotating and driving the recording disk 42 is constructed of the cylindrical portion 8, the bearings 18 and 20, the rotor 21, the stator 11, etc. The base plate 2 also functions as a base member of the spindle motor 3.

The recording disk 42 is mounted on the hub portion 22 of the rotor 21, and the inner peripheral portion of the recording disk 42 is placed on the upper surface of the bulging portion 26. The clamp member 44 is fixed to the upper end portion of the hub portion 22 by means of a fixing screw 43. By thus securing the clamp member 44, the recording disk 42 is interposed between the bulging portion 26 of the hub portion 22 and the clamp member 44. In the illustrated example, the outside diameter of the annular concave portion 6 is about 2 times the outside diameter of each of the bulging portion 26 and the clamp member 44, and the outside diameter of the recording disk 42 is about 3 times the outside diameter of each of the bulging portion 26 and the clamp member 44. The outer periphery of the recording disk 42 is positioned slightly inwardly of the outer edge of the base plate 2.

Between the under surface (the surface on the side of the base plate 2) of the recording disk 42 and the upper surface of the rotor portion 28, there is a space in which the under side head means 46 to be disposed on the upper and lower surfaces of the recording disk 42 can go in and out. In FIGS. 1 and 2, a first convex portion 48 is provided in the left portion of the base plate 2. Furthermore, the right portion of the base plate 2, specifically most of its portion excepting the first convex portion 48 and a concave portion 56 for a head position determining mechanism, has provided therein a second convex portion 58. The first convex portion 48 protrudes greatly more inwardly than the second convex portion 58, and its upper surface approaches the recording disk 42. Hence, the first space between the first convex portion 48 and the recording disk 42 is small, and the head means 46 cannot intrude into this space. On the other hand, the second space between the second convex portion 58 and the recording disk 42 is larger than the first space, permitting the head means 46 to intrude into such space. Accordingly, the second convex portion 58 is present below the moving path of the head means 46, and the first concave portion 48 is not existent.

The annular concave portion 6 of thee base plate 2 is defined by the first convex portion 48 and the second convex portion 58. The first convex portion 48 defines a range exceeding about 200° of the annular concave portion 6, and the remaining range of the annular concave portion 6 is defined by the second convex portion 58. In the specific example, the concave portion 56 for the head position determining mechanism is positioned at a right front portion in FIG. 1, and its height, as shown in FIG. 2, is defined so that it becomes between the bottom surface of the annular concave portion 6 and the upper end of the second convex portion 58. Between the recording disk 42 and the rotor portion 28, there is a gap in which the head means 46 can go in and out. Since portions other than the first convex portion 48 in the outer wall portion of the annular concave portion 6 in the base plate 2 have formed therein a second convex portion 58 in which the head means 46 can go in and out, the range in which the head means 46 can be positioned on both surfaces of the recording disk 42 starts from the outer periphery of the bulging portion 26 and terminates at the outer peripheral edge of the recording disk 42 via the annular concave portion 6.

A pivot assembly 60 is mounted on the concave portion 56 for the head position determining mechanism. This pivot assembly 60 supports an arm 62 rotatably relatively to the base plate 2, and the head means 46 is disposed at the forward end portion of the arm 62. The head means 46 serves to write information in the recording disk 42 and/or read the information from the recording disk 42. A yoke 64 of a voice coil motor and a guide pin 66 are provided in the concave portion 56. The voice coil motor serves to rotate the arm 62 and determine the position of the head means 46. The guide pin 66 is provided in the base plate 2 for determining the position of the yoke 64.

The lubricant for bearings (not shown) used in the pivot assembly 60 is preferably an oil rather than a grease because it suppresses the variations of the effective torque by the voice coil motor and increases the positioning determination precision of the head means 46.

The drawing portion 68a of the flexible circuit board 68 is electrically connected to a connector 70 provided in the right rearward portion of FIG. 1 as shown below. With reference to FIG. 1 together with FIGS. 9 to 12, the flexible circuit board 68 is adhered to the under surface of the coils 16 wound on the stator core 14. The drawing portion 68a of the flexible circuit board 68 is conducted from the bottom surface of the annular concave portion 6 diametrically outwardly of the annular concave portion 6 via the peripheral surface of the annular concave portion 6 and the upper surface of the second convex portion 58. The forward end portion of the drawing portion 68a is fixed onto the forward end portion 70a of the connector 70 and by soldering, its terminal portion is connected to a connector pin 72. The forward end portion 70a of the connector 70 is formed slightly lower than the other portion of the connector 70 in order to secure the height of the solder by soldering of the drawing portion 68a.

An insertion hole 74 is formed to pass through the base plate 2 (the second convex portion 58). At a position corresponding to the insertion hole 74 in the drawing portion 68a, an aperture is provided. Furthermore, a raising preventing member 78 is provided for preventing the raising of the drawing portion 68a. This raising preventing member 78 is formed by bending a plate member corresponding to variations of a height ranging from the bottom surface and the peripheral surface of the annular concave portion 6 to the upper surface of the second convex portion 58, and a downwardly extending insertion projecting portion 80 is provided at a position corresponding to the insertion hole 74.

The insertion projecting portion 80 goes through the aperture of the drawing portion 68a and is inserted into the insertion hole 74. The end portion projecting from the insertion hole 74 is calked whereby the raising preventing member 78 is fixed to a board 10. A hole formed in an insertion projecting portion 80 is sealed by a seal 82. The raising preventing member 78 has a first portion 78a existing in one end portion, a second portion 78b extending substantially perpendicularly from the first portion 78a, and a third portion 78c extending substantially horizontally from the second portion 78b. On the other hand, an accommodating concave portion 69 formed in the base plate 2 extends from the right portion in FIG. 11 in the bottom surface of the annular concave portion 6 to the outer peripheral portion, and further extends from the lower end to the upper end of the peripheral surface of the annular concave portion 6. The drawing portion 68a of the flexible circuit board 68 is positioned inside the accommodating concave portion 69. It extends along the bottom surface and the peripheral side surface of the annular concave portion 6, and further extends to the connector 70 along the upper surface of the second convex portion 58. The first portion 78a of the raising preventing member 78 covers a portion positioned at the bottom surface of the annular concave portion 6 in the drawing portion 68a. The second portion 78b covers a portion positioned on the peripheral side surface of the annular member 6 in the drawing portion 68a, and further the third portion 78 covers a portion positioned on the upper surface of the second convex portion 58 in the drawing portion 68a. Thus, the raising of the drawing portion 68a is exactly prevented by the raising preventing member 78 (see FIG. 9). Incidentally, the first portion 78a and the second portion 78b of the raising preventing member 78 are desirably accommodated in the accommodating concave portion 69. By covering the drawing portion 68a with the first portion 78a and the second portion 78b of the raising preventing member 78, the drawing portion 68a and the rotor 21 can be prevented from contacting with each other.

Figure 7:
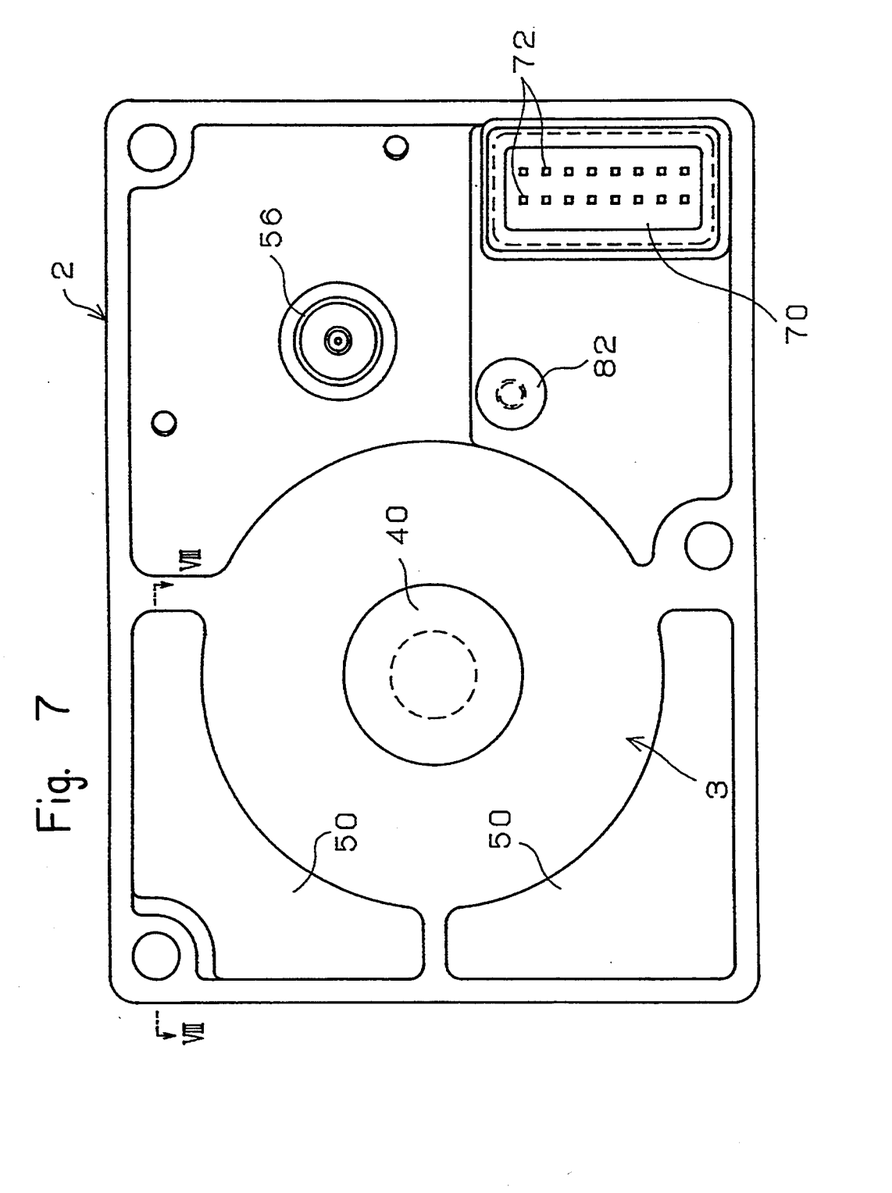
FIG. 7 is a bottom view of the disk driving apparatus of FIG. 1.
Figure 8:
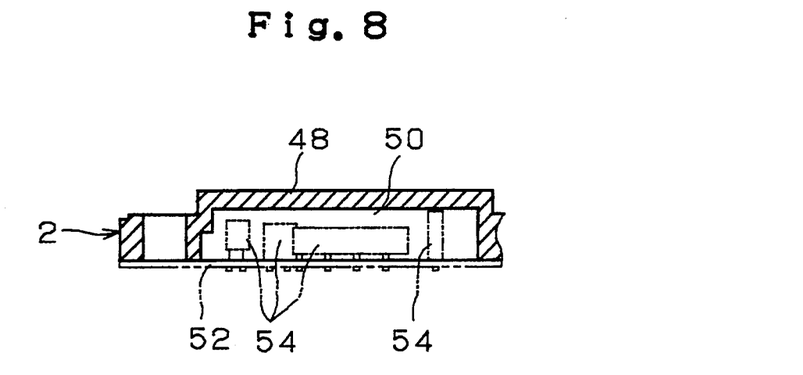
FIG. 8 is a sectional view of a VIII—VIII line in FIG. 7.
Figure 9:
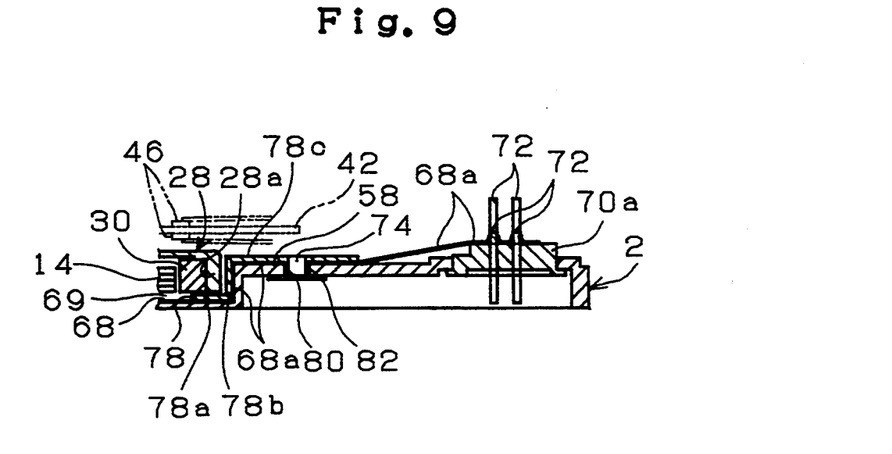
FIG. 9 is a sectional view of a IX-0-IX line in FIG. 1.
Figure 10:
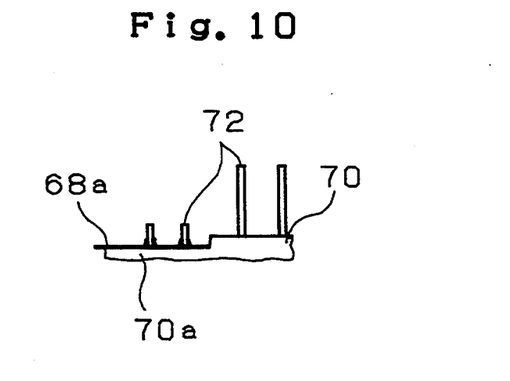
FIG. 10 is a partial enlarged view showing a terminal portion of the connector member in the disk driving apparatus of FIG. 1 on an enlarged scale.
Figure 11:
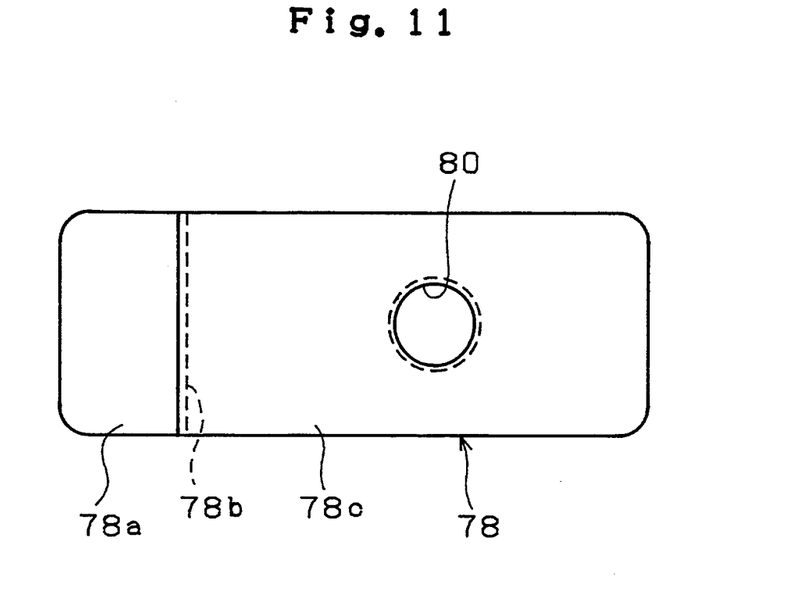
FIG. 11 is a top plan view of a raising preventing member in the disk driving apparatus in FIG. 1.
Figure 12:
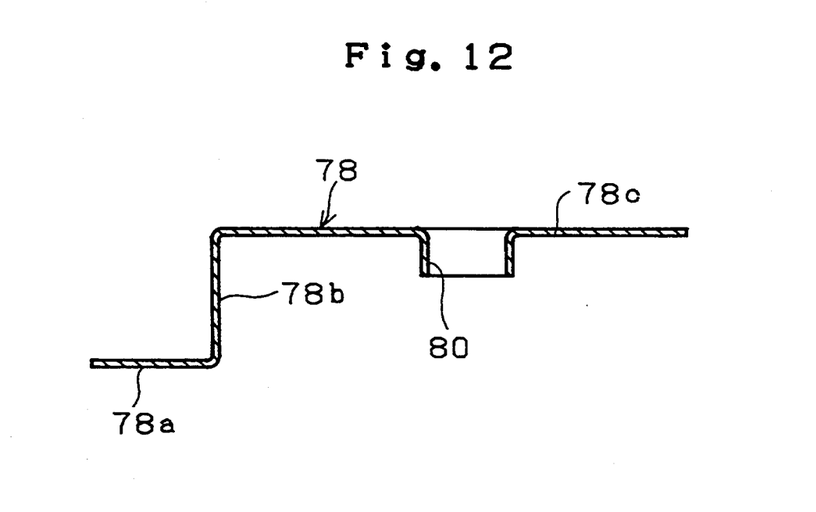
FIG. 12 is a sectional view of the raising preventing member of FIG. 11.

With reference to FIGS. 7 and 8 , a part-receiving concave portion 50 (constituting a second concave portion) opening outwardly is provided in the back surface of the first convey portion 48 of the base plate 2. A circuit board 52 is secured to the back surface of the base plate 2, and electronic components 54 fitted onto the circuit board 52 are received in the receiving concave portion 50. The electronic components 54 serve to operate and control the disk driving apparatus. By receiving at least a part of the operating and controlling electronic components 54, the driving apparatus becomes more small-sized and thinner.

FIGS. 13 to 16 show the principal parts of a second specific embodiment of the recording disk driving apparatus. In this second specific embodiment, the raising preventing member and its related elements are improved. Incidentally, in the second specific embodiment, substantially the same members as in the first specific embodiment will be illustrated by attaching the same reference numerals.

Figure 13:
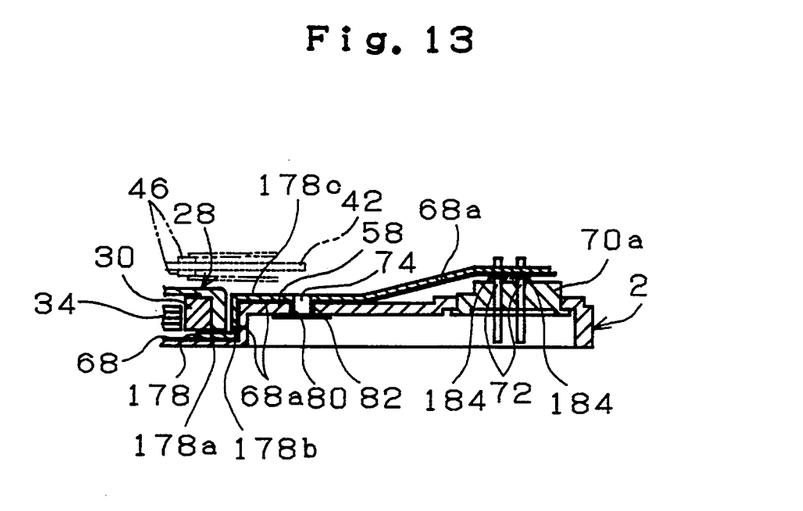
FIG. 13 is a partial sectional view showing the principal parts of a second specific example of a recording disk driving apparatus in which improvement has been brought about in the raising preventing member and members relating to it.
Figure 14:
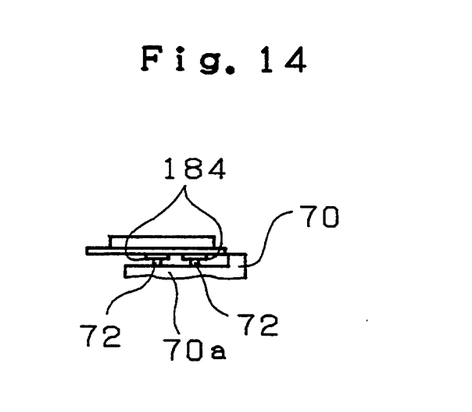
FIG. 14 is s is a partial enlarged view showing the terminal portion of the connector member in the recording disk driving apparatus of FIG. 13 on an enlarged scale.
Figure 15:
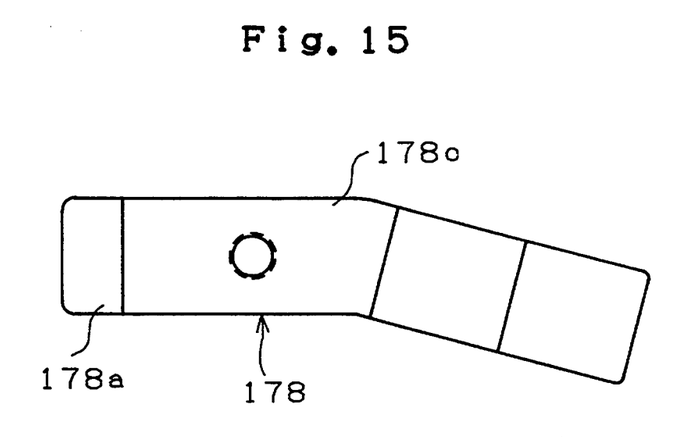
FIG. 15 is a top plan view of the raising preventing member in the modified example.
Figure 16:
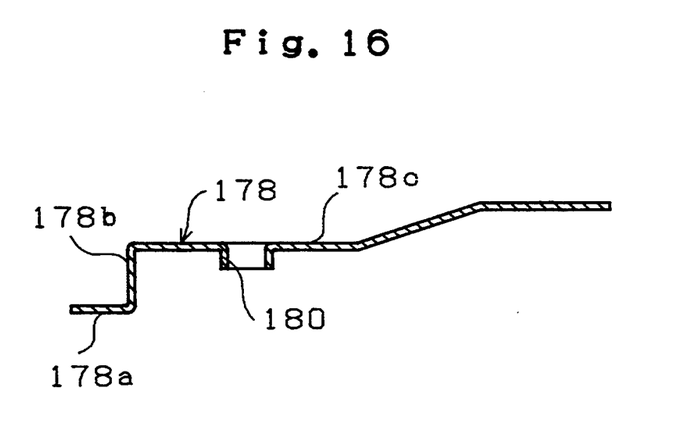
FIG. 16 is a sectional view of the raising preventing member of FIG. 15.

In FIG. 13, a raising preventing member 178 is produced by bending an elastic material such as a leaf spring material, and at a position corresponding to the insertion hole 74 of the base plate 2, a downwardly-directed insertion projecting portion 180 is provided to pass through the aperture formed in the drawing portion 68a of the flexible circuit board 68 and inserted in the insertion hole 74. By fixing the raising preventing member 178 to the base plate 2, the raising of the drawing portion 68a of the flexible circuit board 68 is prevented. In this example, the raising preventing member 178 has a first portion 178b covering a portion positioned at the bottom surface of the annular concave portion 6 in the drawing portion 68a, and a second portion 178a covering a portion positioned at the peripheral side surface of the annular concave portion 6 in the drawing portion 68a, and a third portion 178c covering a portion positioned on the upper surface of the second convex portion 58 of the base plate 2, and this third portion 178c extends to the connector 70. By the third portion 178c of the raising preventing member 178, the forward end portion of the drawing portion 68a of the flexible circuit board 68 is elastically held so that a terminal region 184 located in the under surface comes into press contact with the terminal 72. The soldering step may be omitted to connect the flexible circuit board 68 and the connector 70 electrically. Futhermore, the height of a portion where the terminal region 184 of the flexible cicuit boart 68 is connected to the terminal 72 can be restricted to a smaller extent than in the case of performing soldering, and thus, the recording disk driving apparatus on the whole can be made thinner.

Figure 17:
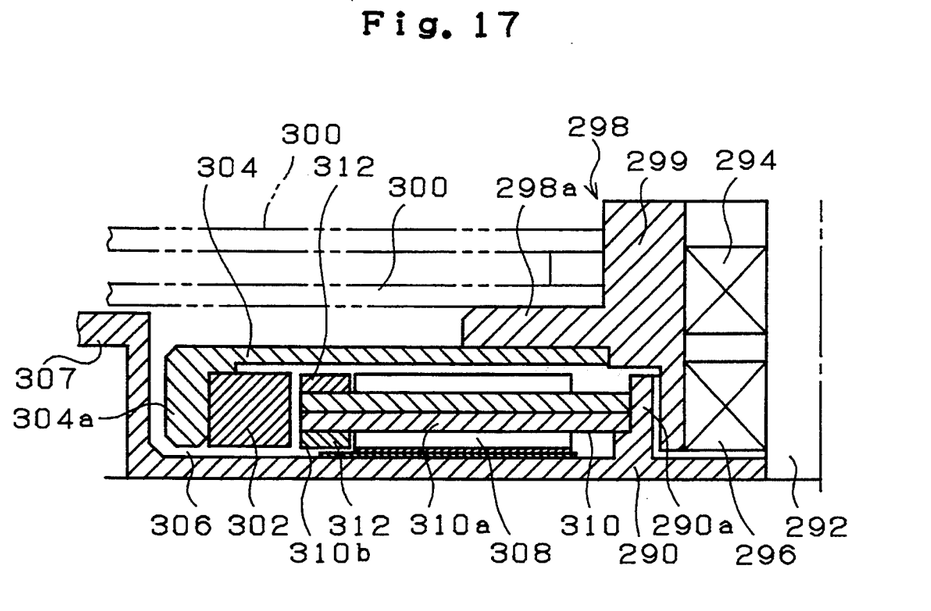
FIG. 17 is a sectional view showing the principal parts of the modified example o the spindle motor.
Figure 18:
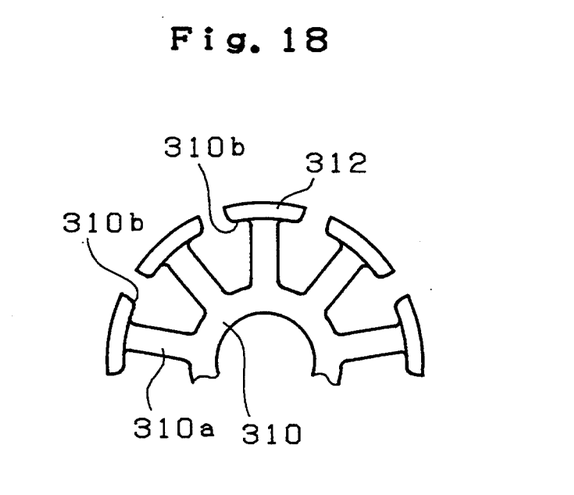
FIG. 18 is a partial top plan view showing the principal parts of the stator core of the spindle motor of FIG. 17.

FIGS. 17 and 18 show s modified example of the spindle motor. A stay 292 is provided upstandingly on a base plate 290, and s rotor 298 is rotatably supported via bearings 294 and 296 on the outer peripheral side of the stay 292.

A pulging portion 298a for supporting a recording disk 300 is provided on the outer peripheral wall of a hub portion 299 of s rotor 298. An inner peripheral portion of s rotor portion 304 holding rotor magnet 302 is fixed to the lower side of the bulging portion 298a. A suspending portion 304a holding an annular rotor magnet 302 is provided on the outer peripheral portion of the rotor portion 304. The suspending portion 304a and on annular concave portion 306 are opposed to each other with a slight diametrical gap therebetween.

In this modified example, two recording disks 300 are mounted on the hub portion 299. When a plurality of disks are mounted on the hub portion 299, the distance between the lowermost recording disk 300 and s first convex portion 307 and a second convex portion (not shown) of the base plate 290 is important, and by prescribing this distance in the same was as in th first embodiment, the same action and effect can be achieved as in the first specific embodiment.

An annular protrusion 290a is provided on the outer peripheral side of the hub portion 299 of the base plate 290, and a stator core on which a stator coil 308 is wound up is outwardly inserted and fixed. A coupling portion 310a on which the stator coil 308 is wound among the teeth of the stator core 310 is formed thin in an axial direction in order to suppress the height of the spindle motor portion. In order to prevent the opposing area of an addendum portion 310b with respect to the rotor magnet 302 from becoming small, electromagnetic steel sheets are laminated on the upper and lower portions and fixed by calking. By this operation, a further thinning can be realized without much impeding the properties of the motor.

Specific embodiments of the recording disk driving apparatus in accordance with this invention have been described. The present invention, however, is not limited to these specific embodiments, and various modifications and alterations are possible without departing from the range of the present invention claimed and described herein.

What is claimed is:

1. A motor comprising a base member, a rotor rotatable relatively to the base member, a magnet mounted on the rotor and a stator secured to the base member in opposition to the magnet, the stator having an annular base portion, a stator core provided with a plurality of tooth portions extending radially outwardly from the annular base portion, and coils wound as required on the tooth portions of the stator core; wherein a nearly annular member is provided in the base member, a plurality of positioning protrusions are provided at intervals in the annular member, the corresponding positioning protrusions are positioned in slots defined by adjoining tooth portions of the stator core, the positioning protrusions of the annular member define a nearly annular accommodating space in cooperation with the plurality of tooth portions of the stator core, an adhesive for blocking the stator to the base member is filled in the accommodating space, and the positioning protrusions of the annular member prevent the adhesive from flowing between the adjoining tooth portions of the stator core to the outside of the stator core.

2. The motor of claim 1 wherein an annular concave portion is provided in the base member, the annular member is disposed in the bottom surface of the annular concave portion, and at least a part of the rotor is positioned in the annular concave portion.

3. The motor of claim 1 wherein the annular member is provided integrally with the base member, and the adhesive binds the stator to the base member and the annular member.

4. The motor of claim 1 wherein the annular member is provided separately from the base member, and the adhesive binds the stator and the annular member to the base member.

5. The motor of claim 1 wherein the annular member has a nearly annular supporting portion, the plurality of positioning protrusions are provided at intervals in the supporting portion, each of the plurality of tooth portions has a coupling portion extending radially outwardly from the annular base portion and an addendum portion of a tooth portion provided in a radially outwardmost portion of the annular base portion, the addendum portions of the plurality of tooth portions are placed at predetermined portions in the supporting portion of the annular member, the corresponding positioning protrusions are positioned in the slots defined by the adjoining tooth portions of the stator core, and the supporting portion and the positioning protrusions of the annular member cooperate with the addendum portions of the plurality of tooth portions of the stator core to define the accommodating space.

6. The motor of claim 1 wherein a flexible circuit board for supplying an electric current to the coils is disposed in the inner surface of the base member, a band-like drawing portion is provided in the flexible circuit board, a notch is formed over a predetermined angular range in a part of the annular member, and the drawing portion of the flexible circuit board extends radially outwardly through the notch.

7. The motor of claim 6 wherein an accommodating concave portion extending radially outwardly through the notch is defined in the inner surface of the base member, and at least a part of the drawing portion of the flexible circuit board is conducted radially outwardly through the accommodating concave portion.

8. The motor of claim 6 wherein a raising preventing member for preventing the raising of the drawing portion of the flexible circuit board is provided in the base member.

9. The motor of claim 1 wherein the motor is a spindle motor for rotating and driving the recording disk, and the rotor is provided with a hub portion on which the recording disk is mounted, and a rotor portion mounted on the under side of the hub portion with the magnet mounted on its inner peripheral surface.

* * * * *